March 19, 1968     R. E. HUTCHINS     3,374,342
PHOTOGRAPHIC ILLUMINATING DEVICE
Filed Oct. 13, 1965
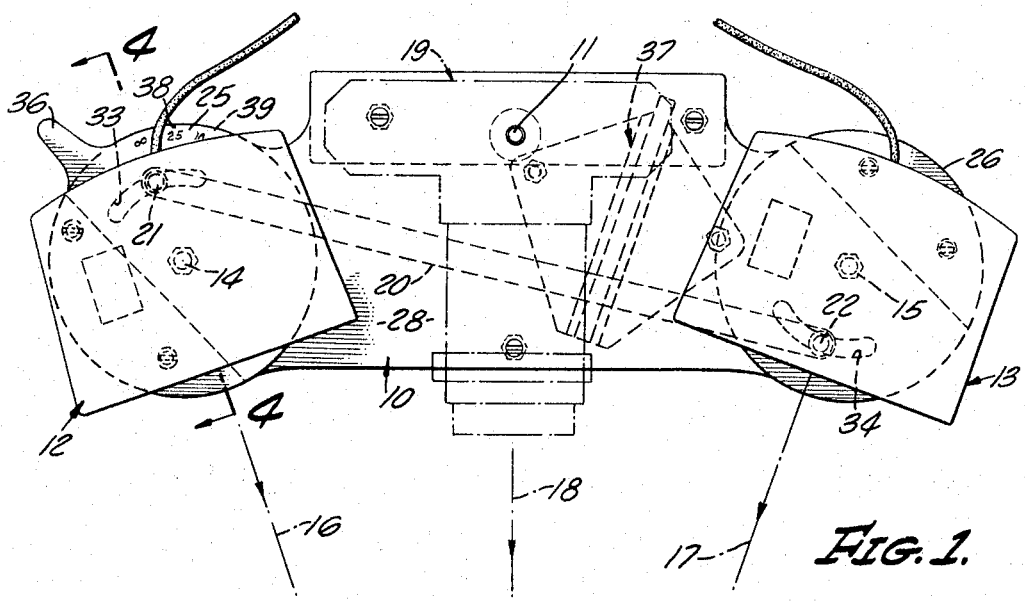
FIG. 1.
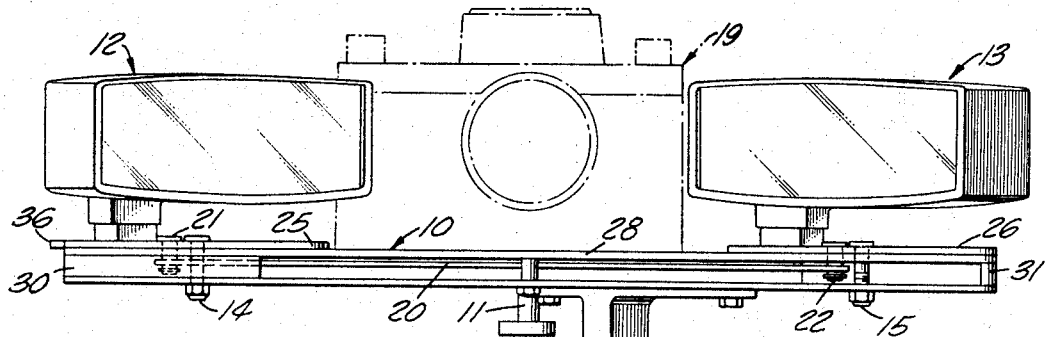
FIG. 2.
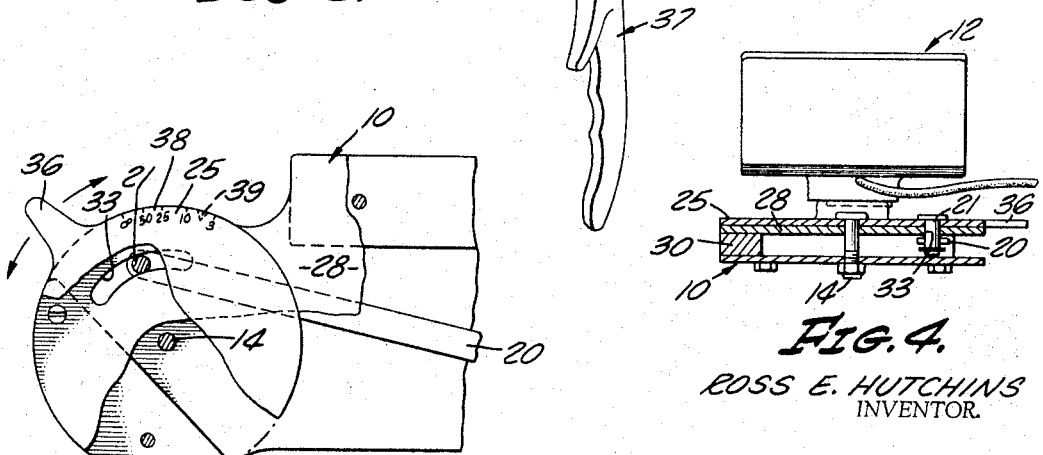
FIG. 3.
FIG. 4.
ROSS E. HUTCHINS
INVENTOR.
BY
AGENT 3,374,342
PHOTOGRAPHIC ILLUMINATING DEVICE
Ross E. Hutchins, Starkville, Miss.
(P.O. Drawer EH, State College, Miss. 39762)
Filed Oct. 13, 1965, Ser. No. 495,440
6 Claims. (Cl. 240—1.3)

ABSTRACT OF THE DISCLOSURE

The invention provides a portable, unitary combination of a base which is adapted to hold a camera thereon, together with a pair of illuminators laterally disposed with respect to said camera and affixed to said base but rotatable about parallel axes at right angles to the base and with a linkage such that both illuminators illuminate the same point on the optical axis.

---

This invention relates to illuminating means for photography, and more particularly for closeup still or cinematic photography.

Closeup photography, especially in the photography of natural specimens such as plants or animals in their natural habitat, presents many practical difficulties, not the least of which is the problem of providing adequate and proper lighting for the subject. This is especially a difficult matter if circumstances prevent a leisurely technique; photographing a humming bird while alighting on a flower, or a butterfly momentarily at rest on the ground, scarcely gives time for achieving optimum lighting arrangements using the procedures generally heretofore available.

The problem has been solved to some extent by the use of so-called ring illuminators which surround the lens of the camera and are generally of the flash tube kind. Ring illumination is satisfactory only for specialized subjects and has found its greatest usefulness in certain medical and dental applications. By and large, it fails to give adequate modeling to the subject, and I have found that the source of light for satisfactory representation of most small, natural objects should be displaced from the optical axis of the camera, so that the lighting is partly quasifrontal and partly from the side. This is accomplished in a well-known fashion by the arrangement of a multiplicity of lights to the side of the operator and generally to some extent behind him. However, the usual mechanical means for achieving this are not well suited to closeup photography in the field, especially where the camera operator may have only a few seconds to adjust the camera and lighting means and take the picture, while the subject is still in position.

An object of the present invention is to provide a portable unitary combination of a base, a camera, and a pair of illuminators, all of which co-operate to readily concentrate the light on the subject to be photographed, particularly a nearby subject.

Other objects of the invention will appear as the description thereof proceeds.

In the drawings,

FIGURE 1 is a top view, partly phantom, showing the overall arrangement in accordance with my invention.

FIGURE 2 is a front view of the device in accordance with my invention taken from the viewpoint of the subject to be photographed.

FIGURE 3 is a partially cut away, fragmentary detail view of the left-hand portion of FIGURE 1.

FIGURE 4 is a side view, partly in section, taken as shown by the arrows in FIGURE 1.

Generally speaking and in accordance with an illustrative embodiment of my invention, I provide a base 10 which is of generally flat shape, horizontally disposed in normal use, and which bears in its intermediate portion and more preferably in a central location in said base, a camera attaching means 11. Laterally disposed with respect to the central portion of the base are a pair of illuminating-device attaching means 25 and 26, each bearing illuminating devices 12 and 13, which may for illustrative purposes be flash heads of common type. The attaching means 25 and 26 with their flash heads 12 and 13 are rotatable about vertical axes 14 and 15 respectively. It will be evident that with the illustrative illuminating means, each of which sends out a beam of light in the horizontal direction, as shown by the arrows in FIGURE 1, rotation of the flash heads 12 and 13 will nevertheless keep their beams 16 and 17 in the same general horizontal plane as that defined by the base 10, and in substantially the same horizontal plane as the optical axis 18 of the camera 19. The rotation of the two flash heads 12 and 13 is restrained by a mechanical coupling means comprising a linkage 20 which is pivoted at one end to attaching means 25 and thus also to illuminating means 12 by a pivot 21 which is located behind axis 14; whereas the opposite end of linkage 20 is connected to attaching means 26 and illuminating means 13 by a pivot 22 which is located in front of corresponding axis 15. The attaching means most conveniently comprises a pair of turntables 25 and 26 which are affixed to base 20 by pivot means 14 and 15 respectively; and which likewise bear pivots 21 and 22 which form part of the mechanical coupling means just mentioned.

I find it convenient to form base 10 of two relatively thin, parallel metal plates 28 and 29, which are held together by spacer blocks 30 and 31. With this arrangement, suitable crescent-shaped apertures 33 and 34 are cut out of the top plate 28 so as to permit pins 21 and 22 respectively, which, as will readily be understood, move in a circular fashion about axes 14 and 15 as centers respectively. The linkage 20 is conveniently formed of a thin strip of metal, as shown in the drawings.

One of the turntables, conveniently the right-hand turntable 25 as viewed by an operator behind the camera 19, bears a projecting lug or handle 36, conveniently formed from the same sheet of metal as turntable 25. It will be evident that upon rotating turntable 25 as by pushing or pulling on lug 36, turntable 26 rotates an equal amount but in the opposite direction. Thus, flash heads 12 and 13 are caused to have their beams 16 and 17 always coincident at the same point in optical axis 18. It will, of course, be understood that the beams have a certain angular spread, but even so, each beam 16 and 17 in general will have its greatest intensity along a particular axis, which is that shown and described. Thus, no matter what distance from the camera at which the object to be photographed is located, the operator merely points the inventive device at the object, which of course is the same as to say that the optical axis 18 of the camera is made to substantially intersect the object, which is facilitated in all modern cameras by some sort of view finder which is an integral part of the camera 19; the operator focuses the camera for the object-to-camera distance in question, which again is facilitated in all of the better modern cameras by coupled range finders, ground-glass viewing devices, and the like; the operator moves lug 36 so as to cause the light beams to converge on the object, and then takes the picture. The manipulation of the device is facilitated by a handle grip 37 which is fastened to the bottom of the base. This is conveniently placed slightly to the left of center of the base as viewed by the operator, and as indicated in the drawings, which leaves the right hand of the operator free for manipulating the various adjustments and controls on the camera and operating lug 36 so as to position the light beams.

Depending upon circumstances, illuminating means 12 and 13 may be of a type which continuously gives a beam of light, over several seconds, several minutes, or indefinitely; or it may be of the so-called "flash" type, in which a momentary flash of light is brought about by the firing of a flash bulb or by an electrical discharge through a gas-filled flash tube. Such devices are of course well known and need not be described in any greater detail. It is particularly convenient to electrically couple the illuminating devices 12 and 13, especially when they are flash heads, by well-known means to the camera 19, so that the flash will occur at the instant that the shutter of the camera is opened in making the exposure.

As an aid in the adjustment of the proper convergences of the light beams of the illuminating devices, I may optionally engrave a distance scale associated with the linked turntables, so that the operator will know in advance what the setting of the light beam is. This is shown as a scale of feet 38 on the top of turntable 25, the distance chosen being read by reference to a fiduciary nick 39 in the edge of plate 28.

The materials of construction used in carrying out my invention are not critical. In general, aluminum may be used for all parts; or aluminum for the sheet and block parts, and steel, brass, or stainless steel for those parts which are threaded.

The dimensional scale of the inventive device again may be varied within wide limits, being accommodated to the size of camera used. Where a still camera of the common type producing 24-mm. by 36-mm. negatives on standard 35-mm. motion picture film is used, a device of suitable size may be constructed in accordance with the drawings wherein the center-to-center distance of axes 14 and 15 is about eleven inches, all other dimensions being to the same scale.

It will be observed that the invention accomplishes its objects. A unitary assembly is provided which indeed can be held conveniently by the hand, and which combines in a cooperating fashion a camera and a pair of illuminating devices, all coupled in the fashion described.

It will be understood that while I have described my invention with the aid of specific examples, nevertheless, many variations in arrangement, proportions, dimensions, and materials of construction may be made, all within the broad scope of the invention as set forth in the claims which follow.

Having described my invention, I claim:

1. In combination, a base of generally flat shape and having lateral extension and bearing means for attaching a camera thereto in a fixed position with respect to said base with the optical axis of said camera at right angle to said lateral extension; a pair of illuminating-device attaching means affixed to said base laterally disposed with respect to said camera position and at a fixed distance on either side of said camera position; said pair of illuminating-device attaching means attached to said base and being rotatable about parallel axes at right angles to said base; and mechanically coupled means connecting said illuminating-device attaching means so that rotation of one is imparted in an opposite sense equally to the other, whereby said illuminating devices each present a like preselected angle to the optical axis of said camera.

2. The combination in accordance with claim 1 wherein said illuminating devices are disposed equidistant with respect to said camera position.

3. The combination in accordance with claim 1 wherein said illuminating device attaching means comprises a pair of turntable means generally coplanar with said base.

4. The combination in accordance with claim 3 wherein said mechanically coupled connecting means comprises a linkage bar disposed in said base, each end of said bar being pivotally attached to said turntable means at points eccentric of each said turntable means.

5. The combination in accordance with claim 1 which includes a handle attached to and projecting downwardly from the bottom side of said base.

6. The combination in accordance with claim 4 which includes a handle attached to and projecting downwardly from the bottom side of said base.

References Cited

UNITED STATES PATENTS

| | | | |
|---|---|---|---|
| 2,560,200 | 7/1951 | Werzyn | 240—1.3 XR |
| 2,596,376 | 5/1952 | De Goeij | 240—1.3 XR |
| 3,165,025 | 1/1965 | Hart | 240—1.3 XR |
| 3,263,584 | 8/1966 | Knus | 240—2 XR |

NORTON ANSHER, *Primary Examiner.*